3,393,049
PROCESS FOR MAKING CARBON MONOXIDE
Jerome Aron, Providence, R.I., and Donald Rivin, Framingham, Mass., assignors to Cabot Corporation, Boston, Mass., a corporation of Delaware
No Drawing. Filed Jan. 21, 1966, Ser. No. 522,051
4 Claims. (Cl. 23—204)

ABSTRACT OF THE DISCLOSURE

The present invention concerns a method for producing carbon monoxide at unusually low temperatures, i.e. below about 500° C. Broadly, the instant process comprises contacting carbon dioxide and carbon in the presence of a carbon material bearing an anion site thereon. Said carbon material serves to catalyze the reaction between carbon and carbon dioxide such as to dramatically lower the temperature at which the reduction of the carbon dioxide can take place.

---

The reduction of carbon dioxide by carbonaceous materials to form carbon monoxide has generally been considered a high temperature reaction. Indeed the thermodynamic equilibrium constant for reaction (1) 

favors carbon dioxide formation at all temperatures below 700° C. Many workers who have studied this reaction have shown that carbon does not reduce carbon dioxide to any significant extent at temperatures below 500 to 600° C. There is, however, evidence for the inefficient reduction of carbon dioxide to carbon monoxide at room temperature by use of high energy irradiation techniques. This latter technique, however, requires expensive equipment and, therefore, is not believed to be economically practical for any commercial application or general experimental synthesis work.

There are many reasons why a process wherein carbon dioxide can be reduced to carbon monoxide at room temperature is of high interest to the chemical industry. Probably the most interesting aspect of such a process is its use to generate carbon monoxide in controlled quantities for use in chemical reactions. Furthermore, the novel process of the invention is of considerable interest in the fuel cell art, for example in applications wherein $CO_2$ formed by reaction of CO and $O_2$ is advantageously reduced to CO for recycling.

Therefore it is an object of the present invention to provide a process for the production of carbon monoxide at room temperature.

It is a further object of the invention to provide production catalysts useful in conversion of carbon dioxide to carbon monoxide and other such reduction reactions.

Other objects of the invention are in part obvious and in part appear hereinafter.

Commonly-owned applications Ser. No. 502,474, filed Oct. 22, 1965, and Ser. No. 502,600, filed Oct. 22, 1965, now pending, by Donald Rivin and Jerome Aron, the instant inventors, have described unique catalysts which may be used in promoting the process of the instant invention. In general, these catalysts provide carbonaceous materials which have surfaces modified to provide anion sites thereon, which sites have catalytic properties useful in the production of polymers and various other chemical reactions.

One such catalytic material, described in the aforesaid Ser. No. 502,600, is called the "carbon radical-anion." This catalyst is prepared by spreading a full or partial monolayer of an alkali metal such as sodium over a carbonaceous material such as carbon black, charcoal or the like and thereupon subjecting the carbon-sodium composition to the action of a solvating ether such as dimethoxyethane, bis(2-ethoxyethyl)ether and solvents known in the art to stabilize cations. The product of this particular reaction provides not only an anion site on carbon black particles but also another electron-rich site which has many of the properties of, and may be treated for most purposes as, a free radical site.

A second type of catalyst, described in the aforementioned Ser. No. 502,474 is the "carbon anion" material which is prepared by the reaction of carbon black with a strong Lewis base such as sodium amide, calcium hydride, triphenyl methyl sodium butyllithium and the like in a solvating ether such as that described above. It is to be noted, however, that the product obtained from this process has an anion site only, rather than both an anion site and a radical site as possessed by the carbon radical-anion material described above.

Typical preparation of these carbon black-anion-type catalysts are set forth below:

TYPICAL PREPARATION OF CARBON RADICAL ANION CATALYST

A 500 ml. three-neck flask was fitted with a magnetic agitator, gas inlet and outlet tubes, and a mercury bubbler on the outlet tube. A septum cup, i.e. an air-tight self-sealing elastomeric cover, was placed over the third opening of the flask.

Twenty grams of the heat treated carbon black described above having a surface of 90 meters$^2$ per gram was placed in the flask and dried therein at about 105° C. with a stream of dry nitrogen. The nitrogen had been passed over copper at 600° C. and then through a drying agent to remove any traces of water present therein.

A quantity of sodium calculated to form 0.5 of a monolayer of sodium on the carbon black was placed in the flask through the septum cap by means of an air-tight syringe. The sodium used was dispersed in a kerosene-based hydrocarbon. This dispersion is available from the Gray Chemical Company in the nominal concentration of 40% sodium. In fact, the dispersion used contained 36.6% sodium. Sodium metal in the form of $\frac{1}{16}''-\frac{1}{4}''$ diameter spheres has alternatively been used to advantage.

The hydrocarbon dispersion medium was distilled off and the sodium and carbon agitated under dry nitrogen atmosphere at 200° C. for an hour during which time the sodium formed a partial monolayer on the carbon black. A quantity of 250 cc. of thoroughly dried dimethoxyethane was then added to the flask at 0° C. and the flask was heated at 50° C. for eight hours.

The carbon black-based product contained the reactive and catalytic carbon radical-anion of the formula:

]•⁻ wherein ] stands for a portion of a carbon black surface; − represents an anion site thereon; and ° represents a radical site thereon.

TYPICAL PREPARATION OF CARBON ANION CATALYST

A 500 ml. three-neck flask was fitted with a mechanical agitator, gas inlet line and a gas outlet line containing a reflux condenser and, more remote from the flask, a mercury bubbler trap.

Into the flask were charged 10.0 grams of channel black, 4.0 grams of sodium amide and 200 cc. of dimethoxyethane which had been dried over sodium. The resulting mixture of ingredients was refluxed for 13 hours under a dry nitrogen atmosphere.

The carbon black-based product contained the reactive and catalytic carbon-anion of the formula

]⁻ wherein ] represents a portion of carbon black surface and — represents an anion site thereon.

The reaction promoted by the instant invention, i.e.

(2)  $C_n^- + CO_2 \rightarrow C_{n-1}^- + 2CO$ wherein $n$ is an integer greater than 1, is believed to be carried out with little or no destruction of the anion site on the carbon black surface. Of the two types of catalysts described above, the anion type rather than the radical-anion type is most favorable for the reduction of carbon dioxide because it promotes a much greater carbon monoxide production rate, probably because of its greater concentration of reactive sites.

This reduction of carbon dioxide to carbon monoxide was particularly surprising in view of the fact that it was expected that carboxylation of the carbon black at the anion site would be achieved almost exclusively by reacting carbon dioxide with the carbon anion or the carbon radical anion.

Two moles of carbon monoxide are formed for each mole of carbon dioxide consumed. Additional carbon necessary to achieve this conversion is conveniently obtained from the carbon black itself. However, it is noted that the anion sites themselves are not usually consumed during this making of carbon monoxide. Rates of conversion of carbon dioxide to carbon monoxide will differ, as has been indicated, with temperature and other factors. On a typical channel black it is entirely practical, however, to achieve a quantity of at least 25 molecules of carbon monoxide per carbon anion site in less than 30 minutes at a temperature as low as 80° C. When the carbon anion catalyst is used conversion rates obtained by use of the carbon radical-anion are somewhat lower.

Although applicants do not wish to be held to any particular theory, it is believed that the reduction of carbon dioxide to carbon monoxide proceeds by a cyclic re-arrangement, that is the formation of a relatively unstable cyclic group which rapidly decomposes to form two moles of carbon monoxide. The reduction process described is temperature sensitive; the reaction proceeds much more rapidly at 80° C. than it does at 0° C.

Any carbon black can be suitably utilized in the process of the invention. The largest number of carbon radical-anion catalytic sites per unit weight of carbon will be achieved when carbon raw material is relatively free of chemical substituents which form the volatile matter most often associated with carbon blacks. Therefore it is recommended that carbon black materials be cleaned by heat treatment of the volatile constituents before being used to prepare the carbon radical-anion catalysts. However, carbon black materials which have been subjected to no treatment may be used to form carbon radical-anions, the only effect which should be noted is the slowing down of carbon monoxide production rates because fewer anion sites will be attached or present on the uncleaned carbon black.

In the preparation of the carbon-anion catalysts, cleaning of the black is not necessary and adequate results can be obtained without any such heat treatment as is desirably used to form the carbon radical-anion.

It is convenient to carry out the instant reaction in a liquid reaction medium. Preferred are those solvating ethers which stabilize cations like dimethoxyethane.

In order to point out more fully the nature of the present invention, the following specific examples are given as illustrative embodiments of the present process and products produced thereby.

Example 1

A 100 ml. three-neck flask is fitted with a magnetic stirrer, vacuum line, gas bulb, gas inlet and outlet line having a mercury bubbler trap. A gram of black is dried for an hour under nitrogen at 200° C. This black, a channel black subjected to no aftertreatment, is cooled to room temperature and 0.5 of a monolayer of sodium, 0.145 gram, is added as spheres of from one quarter to one-sixteenth inch in diameter. The reaction mixture is heated to 200° C. with stirring. After thirty minutes stirring at 100° C. a partial monolayer of sodium on carbon black is formed. The sodium-coated material is then cooled to room temperature and 50 ccs. of distilled dimethoxyethane are introduced into the flask through a septum cap. After four hours reaction time at 50° C., the system is evacuated and carbon dioxide is introduced thereinto until 0.5 atmosphere of pressure is reached. After a further two hour period the pressure had returned to atmospheric. A sample of gas was taken for analysis by mass spectroscopy. The reaction was terminated by addition of concentrated HCl and stirring the reaction for 15 minutes thereafter the addition. The mixture was then diluted with water, filtered, washed until the filtrate was neutral, and dried to constant weight.

The analysis by mass spectrometer disclosed 99.4% of the carbon dioxide was reduced to carbon monoxide.

Example 2

A 100 ml. three-neck flask is fitted with a magnetic stirrer, vacuum line, gas bulb, gas inlet and an outlet line having a mercury bubbler trap. A gram of black is dried for an hour under nitrogen at 200° C. This black, a channel black subjected to no aftertreatment, is cooled to room temperature and 0.5 of a monolayer of sodium, 0.145 gram, is added as spheres of from one quarter to one-sixteenth inch in diameter. The reaction mixture is heated to 200° C. with stirring. After thirty minutes stirring at 200° C., a partial monolayer of sodium on carbon black is formed. The sodium-coated material is then cooled to room temperature and 50 ccs. of distilled dimethoxyethane are introduced into the flask through a septum cap. After four hours reaction time at 50° C., the system is evacuated, cooled to 0° C. and carbon dioxide is introduced thereinto until 0.5 atmosphere of pressure is reached. After a further four-hour period the pressure had returned to atmospheric. A sample of gas was taken for analysis by mass spectrometer. The reaction was terminated by addition of concentrated HCl and stirring the reaction for 15 minutes thereafter the addition. The mixture was then diluted with water, filtered, washed until the filtrate was neutral, and dried to constant weight.

The analysis by mass spectrometry disclosed 98.5% of the carbon dioxide had been reduced to carbon monoxide.

Example 3

A 100 ml., three-neck flask was fitted with a magnetic stirrer, reflux condenser, a gas inlet line, a gas exit line with a mercury bubbler thereon, a septum cap, a 120 ml. gas bulb, and a vacuum source.

A gram of channel black, which had been subjected to no aftertreatment; 0.5 gram of sodium amide, and 50 cc. of dimethoxyethane were introduced into the aforedescribed flask. The reaction was held for 16 hours at reflux under a positive pressure of nitrogen.

After evacuation a quantity of carbon dioxide (120 cc.) was introduced into the system raising the pressure to 0.5 atmosphere. After two hours at 50° C., an analysis was made of the gas in the system revealing that 89.33% of the carbon dioxide charged thereto had been converted to carbon monoxide.

Example 4

The procedure for preparation of the anion sites was carried out in dimethoxyethane solvent and was the same as that described previously with the exception that only 0.125 gram of sodium amide was added to 2 grams of a standard reinforcing furnace black (SAF) sold under the trade designation Sterling S. After sixteen hours during which anion formation was carried out on the black, the reaction vessel was evacuated. Then carbon dioxide was continuously bubbled through the mixture of black and solvent with the off gases going directly to a gas chromatograph for analysis. The addition of carbon dioxide was continued thusly for six hours until no further carbon monoxide production was detectable. The carbon dioxide addition was then terminated, any remaining reaction was terminated with water, and the black was filtered, washed until the filtrate was neutral, and dried in a forced draft oven to constant weight.

Fifty molecules of carbon monoxide were generated per anion site induced on the Sterling S. In view of the fact that there was very little sodium amide present for regenerating any anion sites poisoned during the reaction, it was clearly demonstrated that the same anion sites reduced a plurality of carbon dioxide molecules to carbon monoxide.

It is of course, to be understood that the foregoing examples are intended to be illustrative and that various changes can be made in the ingredients, proportions and conditions set forth therein without departing from the spirit of the invention as defined in the appended claims.

What is claimed is:

1. A process for the preparation of carbon monoxide which comprises reacting carbon dioxide at temperatures below about 100° C. in a solvent medium with carbon black which has been treated with an alkali metal, following which the carbon-alkali metal composition is subjected to the action of a solvating ether.

2. The process of claim 1 in which the solvent medium and solvating ether is dimethoxyethane.

3. A process for the preparation of carbon monoxide which comprises reacting carbon dioxide at temperatures below about 100° C. in a solvent medium with carbon black which has been treated with said solvent containing a Lewis base.

4. The process of claim 3 in which the solvent is dimethoxyethane and the Lewis base is sodium amide.

References Cited

FOREIGN PATENTS 607,600 10/1960 Canada.
855,247 11/1960 Great Britain.

OSCAR R. VERTIZ, *Primary Examiner.*

H. S. MILLER, *Assistant Examiner.*